United States Patent [19]

DePaolis

[11] 4,163,808

[45] Aug. 7, 1979

[54] PROCESS FOR PREPARING AN IMITATION MAYONNAISE AND SALAD DRESSING

[76] Inventor: Potito U. DePaolis, 131 Groverton Pl., Los Angeles, Calif. 90024

[21] Appl. No.: 885,309

[22] Filed: Mar. 10, 1978

[51] Int. Cl.$^2$ ............................................. A23L 1/24
[52] U.S. Cl. .................................. 426/613; 426/656; 426/804
[58] Field of Search ............... 426/589, 804, 613, 656, 426/605

[56] References Cited

U.S. PATENT DOCUMENTS

| | | | |
|---|---|---|---|
| 3,885,052 | 5/1975 | Starr | 426/656 |
| 3,892,873 | 7/1975 | Kolen | 426/613 |
| 3,968,261 | 7/1976 | Goodman | 426/613 |

OTHER PUBLICATIONS

Altschul Processed Plant Protein Foodstuffs, Academic Press Inc., New York, 1958, p. 414.

*Primary Examiner*—Jeanette M. Hunter
*Attorney, Agent, or Firm*—I. Morley Drucker

[57] ABSTRACT

This invention relates to improvements in formulation and preparation of imitation mayonnaise and salad dressings employing isolated soy protein as the sole or dominant emulsifier.

1 Claim, No Drawings

PROCESS FOR PREPARING AN IMITATION MAYONNAISE AND SALAD DRESSING

BACKGROUND OF THE INVENTION

Mayonnaise is defined under U.S. FDA Standards of Identity as an emulsified semisolid food prepared from edible vegetable oil; such as unhydrogenated soybean or safflower oil, acetic or citric acid, and egg yolk. Optional ingredients permitted include salt, natural sweeteners, spices, or spice oils, monosodium glutamate, and any suitable harmless flavor from natural sources. The oil level must be not less than 65% by weight of the mayonnaise and 77-82% is the usual weight range. Mayonnaise is an oil in water emulsion in which the egg yolk constitutes the major emulsifying component.

Salad dressing under the Standards resembles mayonnaise in that it is an emulsion of oil in vinegar using egg as an emulsifier. It differs from mayonnaise in that it also contains starch paste as a thickener.

The oil, egg, vinegar, and the optional ingredients, salt, sweeteners, spices, flavorings, EDTA salts, and monosodium glutamate are described by the salad dressing standards in identical language to that used for the same ingredients in mayonnaise. There is, however, no limitation on the level of total acid in vinegar or the citrus juices, and no salt is normally used.

In both products, the presence of egg as an emulsifier is, in some respects, a drawback as the product then contains some cholesterol and is also considered to be a "high calorie" food.

It is known in the prior art to substitute, for the egg emulsifier in a mayonnaise or salad dressing type of product, an emulsifier consisting mainly of an isolated soy protein (also known as soya isolate) e.g., Supro 620, manufactured by Ralston Purina of St. Louis, Mo. 63188 or Promine from Central Soys, Chicago, Illinois 60604. Such a substitution will provide an imitation mayonnaise or salad dressing product that is relatively low in calories, of high water content, and is cholesterol-free. The high water content, of between 20-40%, is necessary in order to dissolve the soya isolate. However, the resulting products have the following major drawbacks: unstable emulsion formation and high syneresis.

It is a major objective of this invention to produce a process and formulation for the making of an imitation mayonnaise and salad dressing product which eliminates such disadvantages.

SUMMARY OF THE INVENTION

It has been found that (1) if substantially greater amounts of isolated soy protein (ISP) are added to an oil-in-water emulsion than is conventional, (2) if the amount of water that is present is kept to that minimum required to dissolve the ISP, (3) if a much stronger concentrate of acid, e.g., vinegar is employed than is conventional in order to keep the water content of the emulsion to a minimum and (4) if a premix of water and ISP with acid, spices, and a small fraction of the total oil content is first made and blended for a much longer period of time than is conventionally called for, then an imitation mayonnaise or salad dressing product is produced, after vinegar and final oil addition, which has the desired qualities of emulsion stability and low syneresis.

DETAILED DESCRIPTION OF THE INVENTION

The imitation mayonnaise or salad dressing of this invention is an oil in water emulsion in which between 3% to 10%, by weight, of ISP is employed as an emulsifier. This amount of ISP used substantially more than that conventionally employed and water in an amount of from about 20% to about 60% is required to dissolve from 3%-10% ISP, respectively aside from the aqueous acetic acid (vinegar) added.

Vinegar in amounts of 0.1%-2%, by weight, of the finished product is preferably added as 200 grain concentration (20% by weight) which is double the concentration conventionally employed.

The imitation mayonnaise or salad dressing is made in a three-step procedure. In the first step, water, ISP and spices, are added to a small fraction of the total salad oil to be utilized, and the ingredients are admixed for about 5-10 minutes—as compared to the more conventional one minute. In the second step, the vinegar is blended in. In the third step, the remaining major amount of oil is added and admixed in a blender having a shearing action such as a "Waring" blender.

The above-described formulation and procedure, in combination, produces an imitation mayonnaise or salad dressing type product with the advantage of a stable emulsion and in which little, if any, syneresis takes place.

The salad oil source employed may be any of a variety of vegetable oils such as winterized cottonseed, unhydrogenated or hydrogenated, and winterized soybean oil is normally utilized. The salad oil may range from about 40% to 80% by weight in the finished product of this invention and preferably is present at about 65% by weight. The ratio of water to ISP in the final formulation is at least 6:1, by weight.

The acid preferably used is 200 grain vinegar, it is present in amounts that range between 0.1 and 2.0%, by weight, and preferably is present in about 0.5% by weight.

Spices and seasonings used may be mustard, paprika, garlic, cloves, onion, salt, sugar and the like. The spices and seasonings normally constitute 1% or less of the finished mayonnaise or salad dressing product.

A specific operating example for the making of 150# of mayonnaise will now be set forth:

STEP 1

The following ingredients are placed in a paddle-type motor-driven mixer;
15 Qts. Water
9.5# ISP (Supro 620)
8 Oz. Mustard
2 Oz. Garlic
2 Oz. Onion
2 Oz. Lecithin (granulated)
4 Qts. Soybean Oil

STEP 2

The ingredients, totalling about 49# are admixed for about five (5) minutes, at least, and until the mixture becomes whitish in color.

STEP 3

The 49# of admixture from STEP 2 is then placed in a Waring type blender in which the blades of the blender may be operated at very high speed resulting in great shearing forces. The shear forces aid in the emulsification of the final product. 16 oz. of Vinegar (200 grain) are added followed by the addition of 100# (110 quarts) of oil. The oil is blended in very slowly to make 150# of finished product.

It is to be noted that only about 4% of the total oil is added in STEP 1 for "seeding" purposes and in order to enable a stable emulsion to be readily prepared. The ratio of water to oil is about 11:1.

EXAMPLE

A salad dressing is prepared in which all of the ingredients and steps of EXAMPLE 1 are followed with the exception that 7.6# of ISP and 1.9# of pregelatinized starch are employed as a substitute for the 9.5# of ISP.

I claim:

1. A method of manufacture of an imitation dressing selected from the group consisting of an imitation mayonnaise and an imitation salad dressing, which comprises the steps of:
    first admixing an amount of at least 3% but not in excess of 10% isolated soy protein by weight with 20% to 60% water by weight, spices and seasonings, and not more than about 10% of the total salad oil content in the finished dressing, by weight, for at least a five (5) minute period at ambient room temperature to produce a first admixture;
    secondly blending, into said first admixture, from about 0.1% to 2.0%, by weight, vinegar; and
    thereafter adding an additional amount of salad oil to bring the total salad oil content in the finished dressing to from 40% to 80% by weight, under high shearing action, to produce the final dressing.

* * * * *